United States Patent [19]

Metrailer et al.

[11] 4,203,759

[45] May 20, 1980

[54] PROCESS FOR THE PREPARATION OF A VANADIUM-CONTAINING METALLIC ASH CONCENTRATE

[75] Inventors: William J. Metrailer; David E. Mueller, both of Baton Rouge, La.

[73] Assignee: Exxon Research & Engineering Co., Florham Park, N.J.

[21] Appl. No.: 901,700

[22] Filed: May 1, 1978

[51] Int. Cl.$^2$ .............................................. B22F 9/00
[52] U.S. Cl. ........................... 75/0.5 BA; 48/206; 75/1 R; 75/24; 75/84; 75/0.5 BB; 427/62; 427/138
[58] Field of Search ................. 75/1 R, 1 T, 84, 4, 75/24, 82, 0.5 BA, 213; 423/62, 138; 48/206

[56] References Cited

U.S. PATENT DOCUMENTS

| | | | |
|---|---|---|---|
| 3,584,995 | 6/1971 | Baker et al. | 423/62 |
| 3,656,936 | 4/1973 | Haas | 75/84 |
| 3,661,543 | 5/1972 | Saxton | 48/206 |
| 3,702,516 | 11/1972 | Luckenbach | 48/206 |
| 3,753,681 | 8/1973 | Vojkore | 75/1 R |
| 3,759,676 | 9/1973 | Lahn . | |
| 3,807,987 | 4/1974 | Peacock | 75/84 |
| 4,100,521 | 7/1978 | Reinhardt et al. | 423/62 |

FOREIGN PATENT DOCUMENTS

| | | | |
|---|---|---|---|
| 47-32504 | 8/1972 | Japan | 423/62 |
| 7014605 | 4/1971 | Netherlands | 423/62 |

Primary Examiner—L. Dewayne Rutledge
Assistant Examiner—Michael L. Lewis
Attorney, Agent, or Firm—Marthe L. Gibbons

[57] ABSTRACT

A low density particulate vanadium-containing metallic ash concentrate, at least 50 percent of the articles of said concentrate having a diameter not greater than about 1 micron, is produced from a partially gasified coke comprising metallic components including vanadium components by heating the partially gasified coke in an oxidizing atmosphere at a temperataure below the fusion point of the metallic components.

6 Claims, 1 Drawing Figure

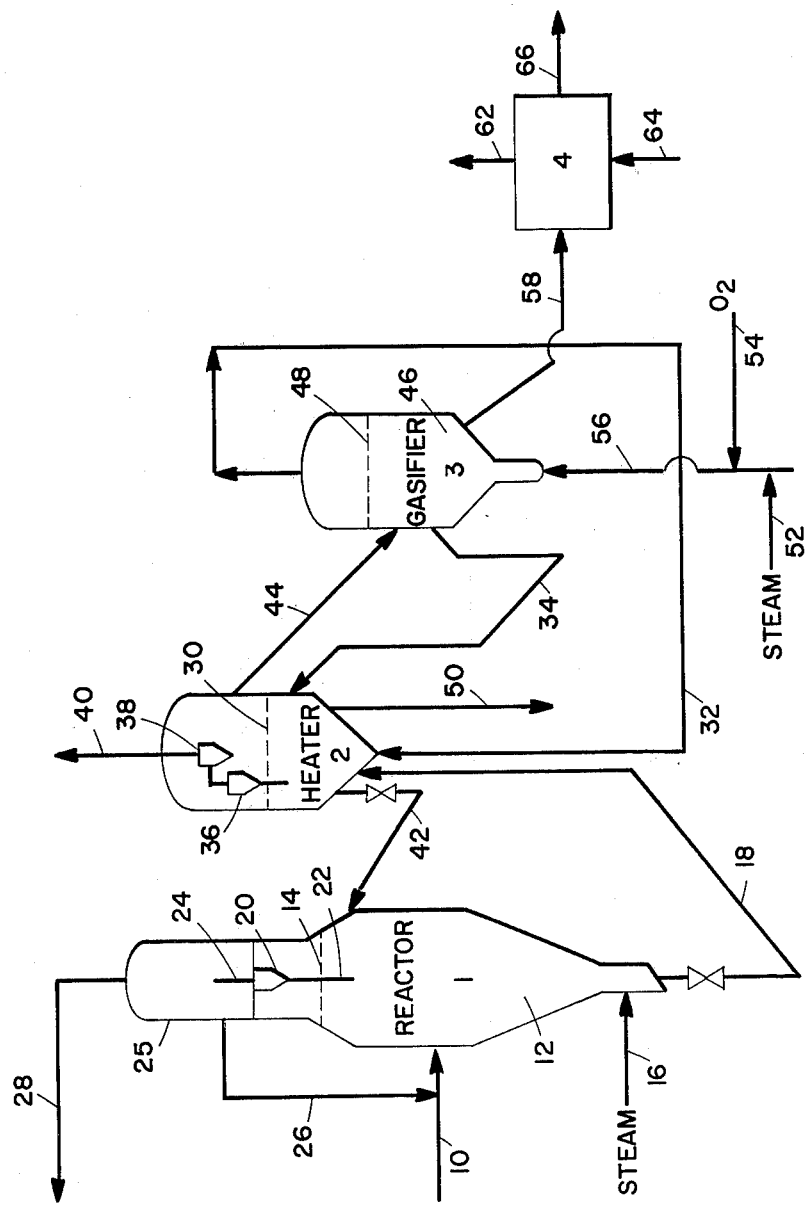

PROCESS FOR THE PREPARATION OF A VANADIUM-CONTAINING METALLIC ASH CONCENTRATE

BACKGROUND OF THE INVENTION

1. Field of the Invention

The present invention relates to a process of producing a vanadium-containing low density metallic ash concentrate from a partially gasified vanadium-containing coke.

2. Description of the Prior Art

It is known that coke comprising vanadium and other metallic components derived from coking petroleum oils can be burned at an elevated temperature to remove a substantial portion of the carbonaceous material therefrom and produce a metallic ash residue, from which vanadium can be recovered by conventional means such as by leaching with acid solutions.

It has now been found that vanadium can be more readily recovered from the metallic ashes when a partially gasified vanadium-containing coke is heated to a temperature below the fusion point of the metallic components present in the coke and that a low density metallic ash concentrate having very fine particles can be produced.

SUMMARY OF THE INVENTION

In accordance with the invention there is provided a process for producing a particulate vanadium-containing low density metallic ash concentrate which comprises: heating a partially gasified coke comprising metallic components, including vanadium components, to a temperature below the fusion point of said metallic components in the presence of a molecular oxygen-containing gas for a time sufficient to remove at least a portion of the coke therefrom and to produce a particulate vanadium-containing low density metallic ash concentrate, at least 50 percent of the particles of said concentrate having a diameter not greater than about 1 micron.

DESCRIPTION OF THE PREFERRED EMBODIMENT

The vanadium-containing partially gasified coke which is further treated to produce a low density metallic ash concentrate of the present invention may be any coke which has been obtained from a vanadium-containing feed such as petroleum oils and which has subsequently been subjected to a gasification process. Preferred partially gasified coke for use as chargestock from which the metallic concentrate is produced is partially gasified coke obtained from integrated coking and gasification processes such as those disclosed, for example, in U.S. Pat. Nos. 3,661,543; 3,702,516; and 3,759,676, the teachings of which are hereby incorporated by reference.

The vanadium-containing partially gasified coke is heated to a temperature below the fusion point of the metallic components present in the coke. Generally, petroleum coke will contain iron, nickel, vanadium and sometimes sodium components. Generally a temperature not greater than about 1050° F. will be suitable, preferably a temperature ranging from about 800° to about 950° F. and at a pressure ranging from atmospheric to several atmospheres. The pressure is not critical. The heating is conducted in the presence of a molecular oxygen-containing gas such as air, or air with a reduced oxygen content. The partially gasified coke during the heat treatment can be maintained as a fixed bed, as a fluid bed or as a moving bed. The heating is conducted for a time sufficient to remove at least a portion of the carbonaceous matter from the partially gasified coke and to produce a low density metallic ash-containing residue substantially free of carbon.

The preferred embodiment will be described with reference to the accompanying FIGURE.

Referring to the FIGURE, a carbonaceous material having a Conradson carbon residue of about 15 weight percent such as heavy residuum having a boiling point (at atmospheric pressure) from about 1000° F.+ is passed by line 10 into a coking zone 12 in which is maintained a fluidized bed of solids (e.g. coke particles of 40 to 1000 micron in size) having an upper level indicated at 14. Carbonaceous feed suitable for the present invention include heavy hydrocarbonaceous oils; heavy and reduced petroleum crudes; petroleum atmospheric distillation bottoms; petroleum vacuum distillation bottoms; pitch, asphalt, bitumen and other heavy hydrocarbon residues; liquid products derived from coal liquefaction processes, and mixtures thereof. Typically, such feeds have a Conradson carbon residue of at least 5 weight percent, generally from about 5 to about 50 weight percent, preferably above about 7 weight percent (as to Conradson carbon residue, see ASTM Test D-189-65). A fluidizing gas, e.g. steam is admitted at the base of coking reactor 1, through line 16, in an amount sufficient to obtain superficial fluidizing velocity in the range of about 0.5 to 5 ft./sec. Coke at a temperature above the coking temperature, for example, at a temperature from about 100° to 800° F. in excess of the actual operating temperature of the coking zone is admitted to reactor 1 by line 42 in an amount sufficient to maintain the coking temperature in the range of about 850° to about 1400° F. The pressure in the coking zone is maintained in the range of about 0 to about 150 pounds per square inch (psig), preferably in the range of about 5 to about 45 psig. The lower portion of the coking reactor serves as a stripping zone to remove occluded hydrocarbons from the coke. A stream of coke is withdrawn from the stripping zone by line 18 and circulated to heater 2. Conversion products are passed through cyclone 20 to remove entrained solids which are returned to the coking zone through dipleg 22. The vapors leave the cyclone through line 24, and pass into a scrubber 25 mounted on the coking reactor. If desired, a stream of heavy materials condensed in the scrubber may be recycled to the coking reactor via line 26. The coker conversion products are removed from scubber 25 via line 28 for fractionation in a conventional manner. In heater 2, stripped coke from coking reactor 1 (cold coke) is introduced by line 18 to a fluid bed of hot coke having an upper level indicated at 30. The bed is partially heated by passing a fuel gas into the heater by line 32. Supplementary heat is supplied to the heater by coke circulating in line 34. The gaseous effluent of the heater, including entrained solids, passes through a cyclone which may be a first cyclone 36 and a second cyclone 38 wherein the separation of the larger entrained solids occur. The separated larger solids are returned to the heater bed via the respective cyclone diplegs. The heated gaseous effluent which contains entrained solids is removed from heater 2 via line 40.

Hot coke is removed from the fluidized bed in heater 2 and recycled to coking reactor by line 42 to supply heat thereto. Another portion of coke is removed from heater 2 and passed by line 44 to a gasification zone 46 in gasifier 3 in which is maintained a bed of fluidized coke having a level indicated at 48. If desired, a purged stream of coke may be removed from heater 2 by line 50.

The gasification zone is maintained at a temperature ranging from about 1,600° to 2,000° F. at a pressure ranging from about 0 to about 150 psig, preferably at a pressure ranging from about 10 to about 60 psig, and more preferably at a pressure ranging from about 25 to about 45 psig. Steam by line 52 and a molecular oxygen-containing gas, such as air, commercial oxygen, or air enriched with oxygen by line 54 pass via line 56 into gasifier 3. The reaction of the coke particles in the gasification zone with the steam and the oxygen-containing gas produces a hydrogen and carbon monoxide-containing fuel gas. The gasified product gas, which may further contain some entrained solids, is removed overhead from gasifier 3 by line 32 and introduced into heater 2 to provide a portion of the required heat as previously described.

A stream of partially gasified coke comprising metallic components including vanadium components is withdrawn from gasifier 3 and passed to a heating zone 4, maintained at a temperature below the fusion point of the metallic components which are generally high in nickel, vanadium, and sometimes sodium. Suitable temperature is a temperature below about 1050° F., preferably a temperature ranging from about 800 to 950° F., and pressure ranging from atmospheric to several atmospheres. The pressure is not critical. A stream of air is passed by line 64 upwardly into a fixed bed of partially gasified vanadium-containing coke which is disposed in heating zone 4. A heat removal means such as a steam coil (not shown) is disposed in heating zone 4 to control the temperature. The carbonaceous matter present in the particles is converted to carbon oxides, and removed overhead from heating zone 4 by line 62. The substantially carbon-free solid residue remaining in the heating zone is a particulate low density vanadium-containing metallic ash concentrate which is removed from heating zone by line 66. The recovered particulate low density vanadium-containing metallic ash concentrate comprises fine particle size material, that is, at least 50 percent, preferably at least 80 percent of the particles having a diameter not greater than about 1 micron. This concentrate may be used as such for the direct (i.e. without vanadium recovery) addition of vanadium to ferrometallic alloys. It can also be used as gas desulfurization reagent to remove hydrogen sulfide from gaseous mixtures by reaction with the hydrogen sulfide in a reducing atmosphere. If desired, vanadium can be removed from the concentrate by conventional means, such as by leaching the metallic concentrate with an acid solution to extract the vanadium, and subsequently recovering the vanadium from the acid solution by conventional means, for example, by precipitating the vanadium from the solution, as is well known in the art.

The following examples are presented to illustrate the invention.

EXAMPLE 1

A sample of petroleum coke was converted to a high vanadium concentrate by first gasifying the coke in air at a temperature of about 1150° F. The metals were further concentrated by burning the coke in a boiler at a temperature above 1600° F. This procedure is a conventional way presently employed to recover vanadium from petroleum coke. The resulting metallic ash concentrate will herein be designated "Ash Concentrate A". A petroleum coke, which was initially partially gasified at a temperature of about 1750° F., was burned in air at a temperature of about 850° F. for about 4 hours. The resulting metallic ash concentrate will herein be designated "Ash Concentrate B", and represents a metallic ash concentrate made according to the process of the present invention. The compositions of Ash Concentrate A and Ash Concentrate B are shown in Table I.

TABLE I

| | Ash Concentrate A | Ash Concentrate B |
|---|---|---|
| Vanadium, wt.% | 10.92 | 18.01 |
| Nickel, wt.% | 1.39 | 12.01 |
| Total Ash, wt.% | 27.2 | 91.0 |

When Ash Concentrate A was extracted with 0.5% aqueous sulfuric acid, 75% of the vanadium was brought into solution. When Ash Concentrate B was extracted with the same sulfuric acid solution, 99% of the vanadium was extracted. The increased recovery of vanadium obtained from Ash Concentrate B is believed to be due to the extremely fine particle size of Ash Concentrate B.

EXAMPLE 2

1.95 grams of Ash Concentrate B was mixed with 3.90 grams of powdered iron and 1.95 grams of fine coke. The mixture was heated to fusion in an induction furnace. Analysis of the resulting metallic pellet showed that 65.8% of the vanadium and 65.1% of the nickel in the charge was recovered in the metallic pellet. The metallic pellet was extremely hard and could only be notched by a silicon carbide tool. It is believed that the small particle size of Ash Concentrate B and the fine coke makes possible the efficient transfer of the metallic components from the ash concentrate to the iron.

EXAMPLE 3

A sample of Ash Concentrate B was tested for use as a regenerable sulfur removal agent. Tests were carried out in a thermo-gravimetric apparatus, analyzed under conditions simulating cyclic chemisorption of sulfur followed by regeneration. The sample was pelletized to form a pellet of about 1/16 inch, heated to 1112° F. in nitrogen. Weight loss was 4.5%, which represented the reduction of a minor amount of oxides by the carbon present. The sample was then subjected to an atmosphere of 10 volume % $H_2S$ in $H_2$ at 1112° F. The sample lost 12.6% by weight very rapidly. This represented the reduction of $V_2O_5$ to $V_2O_3$. Subsequently, the sample recovered 12.9% by weight, which represented the formation of $V_2S_3$. Upon oxidation with 2% $O_2$ in nitrogen, the sample lost 11.6% by weight. This represented the oxidation of $V_2S_3$ to $V_2O_3$. The cycle with $H_2S$ in $H_2$ followed by 2% $O_2$ in $N_2$ was repeated. This second cycle showed a 10.3% weight gain followed by 9.1% weight loss. This showed that the sample of Ash Concentrate B, which is a metallic ash prepared in accordance with the process of the present invention, has the capacity to remove sulfur from gases after regeneration of the metallic ash concentrate.

Thus, the metallic ash concentrate of the present invention can be used as reagent to remove hydrogen sulfide from gases containing the same in a reducing atmosphere.

What is claimed is:

1. A process for producing a particulate vanadium-containing low density metallic ash concentrate which comprises: partially gasifying coke comprising metallic components, including vanadium components, at a temperature ranging from about 1600° F. to about 2000° F. in the presence of steam and an oxygen-containing gas and heating the resulting partially gasified coke comprising said metallic components at a temperature below the fusion point of said metallic components, said temperature below the fusion point being a temperature not greater than about 1050° F., in the presence of a molecular oxygen-containing gas, for a time sufficient to burn at least a portion of the coke therefrom, and to produce a particulate vanadium-containing low-density metallic ash concentrate, at least 50% of the particles of said concentrate having a diameter not greater than about 1 micron.

2. The process of claim 1 wherein at least about 80 percent of the particles of said concentrate have a diameter not greater than about 1 micron.

3. The process of claim 1 wherein said partially gasified coke is heated to a temperature ranging from about 800° to about 950° F.

4. The process of claim 1 wherein said molecular oxygen-containing gas is selected from the group consisting of air, and air of reduced oxygen content.

5. The process of claim 1 wherein said partially gasified coke is a petroleum coke.

6. The process of claim 1 wherein said metallic components comprise iron, nickel and vanadium metals or metal compounds thereof.

* * * * *